United States Patent
Sarukkai

(10) Patent No.: US 11,089,020 B1
(45) Date of Patent: Aug. 10, 2021

(54) SYSTEMS, METHODS, AND MEDIA FOR PROTECTING CLIENT DEVICES FROM INSECURE CLOUD-BASED STORAGE CONTAINERS

(71) Applicant: Skyhigh Networks, LLC, Campbell, CA (US)

(72) Inventor: Sekhar Sarukkai, Cupertino, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 104 days.

(21) Appl. No.: 16/171,027

(22) Filed: Oct. 25, 2018

Related U.S. Application Data

(60) Provisional application No. 62/577,093, filed on Oct. 25, 2017.

(51) Int. Cl.
    *H04L 29/06* (2006.01)

(52) U.S. Cl.
    CPC ............ *H04L 63/10* (2013.01); *H04L 63/20* (2013.01); *H04L 63/101* (2013.01)

(58) Field of Classification Search
    CPC ................................ H04L 63/10; H04L 63/20
    USPC ................................................................ 726/1
    See application file for complete search history.

(56) References Cited

U.S. PATENT DOCUMENTS

| | | | | |
|---|---|---|---|---|
| 4,980,782 | A | * 12/1990 | Ginkel | G06F 21/80 360/135 |
| 2002/0044663 | A1 | * 4/2002 | King | H04L 29/12254 380/284 |
| 2011/0060823 | A1 | * 3/2011 | Phillippe | G06F 11/321 709/224 |
| 2017/0195304 | A1 | * 7/2017 | Cooper | G06N 5/04 |

OTHER PUBLICATIONS

R. K. L. Ko et al., "TrustCloud: A Framework for Accountability and Trust in Cloud Computing," 2011 IEEE World Congress on Services, Washington, DC, 2011, pp. 584-588, doi: 10.1109/SERVICES.2011.91. (Year: 2011).*

* cited by examiner

*Primary Examiner* — Jacob Lipman
(74) *Attorney, Agent, or Firm* — Byrne Poh LLP

(57) ABSTRACT

Mechanisms (such as systems, methods, and media) for protecting a client device from an insecure cloud-based storage container stored on a server are provided, the mechanisms comprising: determining that content accessible by the client device is hosted in a storage container on the server; sending a message to the server to determine what security provisions are in place for the storage container; determining that the storage container is not secure; and blocking access by the client device to the storage container.

15 Claims, 3 Drawing Sheets

SYSTEMS, METHODS, AND MEDIA FOR PROTECTING CLIENT DEVICES FROM INSECURE CLOUD-BASED STORAGE CONTAINERS

CROSS-REFERENCE TO RELATED APPLICATION

This application claims the benefit of U.S. Provisional Patent Application No. 62/577,093, filed Oct. 25, 2017, which is hereby incorporated by reference herein in its entirety.

BACKGROUND

Cloud-based storage continues to be a popular mechanism for storing files. For example, many images and advertisements (e.g., such as banner advertisements) are stored in cloud storage containers (sometimes called buckets) so that web pages (when loading on a client device) can load and display the images and advertisements.

A problem with cloud-based storage containers is that they can be easily misconfigured such that appropriate security protocols are not put in place to protect the content stored in the containers. This can be particularly problematic because a nefarious user can alter the content of such a storage container to include malware and then an unsuspecting user may be exposed to that malware when accessing what should be trustworthy content. For example, if a major newspaper stores an image for a news article in a storage container that is not secure, that image is then modified by a nefarious user, and an unsuspecting user then loads that image while reading the article, the user may be exposed to the malware.

Accordingly, it is desirable to provide new mechanisms for protecting client devices from insecure cloud-based storage containers.

SUMMARY

Systems, methods, and media for protecting client devices from insecure cloud-based storage containers are provided.

In some embodiments, systems for protecting a client device from an insecure cloud-based storage container stored on a server are provided, the systems comprising: a memory; and a hardware processor couple to the memory and configured to: determine that content accessible by the client device is hosted in a storage container on the server; send a message to the server to determine what security provisions are in place for the storage container; determine that the storage container is not secure; and block access by the client device to the storage container.

In some embodiments, methods for protecting a client device from an insecure cloud-based storage container stored on a server are provided, the methods comprising: determining that content accessible by the client device is hosted in a storage container on the server; sending a message to the server to determine what security provisions are in place for the storage container; determining that the storage container is not secure; and blocking access by the client device to the storage container.

In some embodiments, non-transitory computer-readable media containing computer executable instructions that, when executed by a processor, cause the processor to perform a method for protecting a client device from an insecure cloud-based storage container stored on a server are provided, the method comprising: determining that content accessible by the client device is hosted in a storage container on the server; sending a message to the server to determine what security provisions are in place for the storage container; determining that the storage container is not secure; and blocking access by the client device to the storage container.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments, mechanisms (which can include systems, methods, and media) for protecting client devices from insecure cloud-based storage containers are provided.

Figure 1:
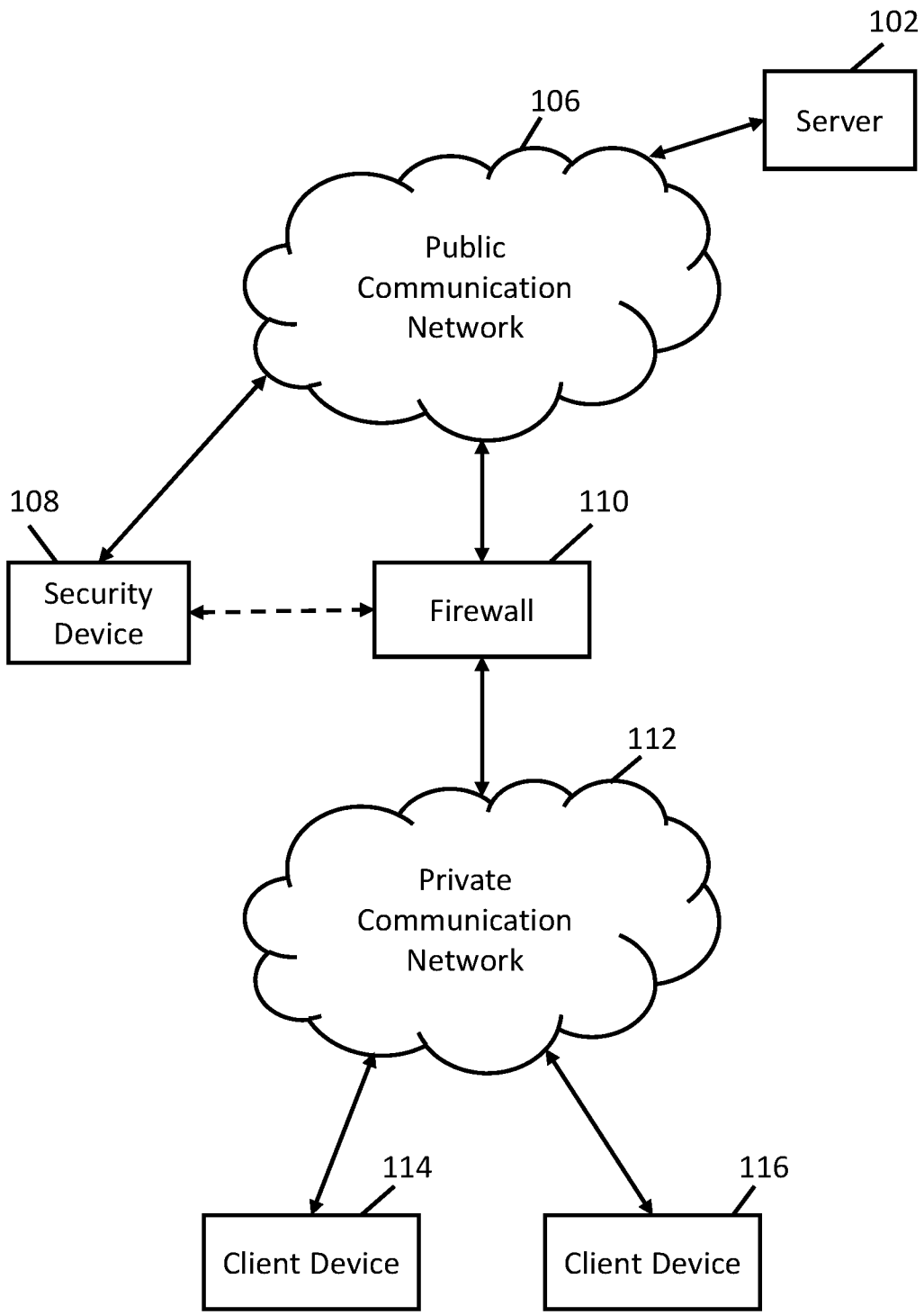
FIG. 1 shows an example of hardware that can be used in accordance with some embodiments.

Turning to FIG. 1, an example 100 of hardware that can be used in accordance with some embodiments of the disclosed subject matter is shown. As illustrated, hardware 100 can include a server 102, a public communication network 106, a firewall 110, a security device 108, a private communication network 112, and/or one or more client devices 114 and 116.

Server 102 can be any suitable server(s) for providing cloud-based storage containers. For example, server 102 can be servers for hosting AMAZON WEB SERVICE's Amazon S3 cloud storage service.

Public communication network 106 can be any suitable combination of one or more wired and/or wireless networks in some embodiments. For example, communication network 506 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), BLUETOOTH, BLUETOOTH LE, and/or any other suitable communication network. While public communication network 106 is described as being public, one or more portions of the network can be private and/or encrypted. For example, network 106 can include one or more virtual private networks.

Private communication network 112 can be any suitable combination of one or more wired and/or wireless networks in some embodiments. For example, communication network 506 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), BLUETOOTH, BLUETOOTH LE, and/or any other suitable communication network. While private communication network 106 is described as being private, one or more portions of the network can be public and/or unencrypted.

For example, network 112 can include the Internet, such as when the Internet is used to implement a virtual private network.

Firewall 110 can be any suitable firewall and can be implemented in any suitable device. For example, firewall 110 can be a dedicated firewall appliance. Firewall 110 can be used for any suitable purpose, such as to prevent users on public communication network 106 from gaining unauthorized access to private communication network 112.

Security device 108 can be any suitable device for monitoring security activity and taking steps to mitigate security concerns. For example, security device 108 can be a general-purpose computer or a special-purpose computer configured to receive security alert messages from client devices 114 and 116 and/or firewall 110 and share data relating to those alert messages with other client device(s) and/or firewall(s). As another example, security device 108 can be a general-purpose computer or a special-purpose computer configured to supervise communications involving client devices 114 and 116 via firewall 110 so that unauthorized, malicious, dangerous, etc. communications can be monitored, blocked, and/or otherwise addressed.

In some embodiments, server 102, communication networks 106 and 112, firewall 110, security device 108, and/or one or more client devices 114 and 116 can be interconnected using any suitable links, such as network links, dial-up links, wireless links, hard-wired links, any other suitable communications links, or any suitable combination of such links.

Client devices 114 and 116 can include any suitable client devices. For example, in some embodiments, the client devices can include desktop computers, laptop computers, tablet computers, mobile phones, Internet of Things (IoT) devices (such as smart thermostats, smart home devices (e.g., an alarm clock, an electric toothbrush, a scale, a lock, a VoIP phone, and/or any other suitable home device), smart personal assistants, smart exercise machines, smart appliances (e.g., lighting systems, kitchen appliances, washer, dryers, fire alarms, spray systems, and/or any other suitable appliances), smart media systems (e.g., a television, a speaker, a streaming media device, a virtual assistant device, and/or any other suitable media device), smart computing devices (e.g., a printer, a computer, a network router, and/or any other suitable computing device), smart HVAC systems, smart security systems, etc.) and/or any other suitable device capable of connecting to a network to transmit and receive data.

Although server 102, firewall 110, and security device 108 are each illustrated as one device, the functions performed by server 102, firewall 110, and security device 108 can be performed using any suitable number of devices in some embodiments. For example, in some embodiments, multiple devices can be used to implement the functions performed by each of server 102, firewall 110, and security device 108. Similarly, although security device 108 and firewall 110 are illustrated as being separate, in some embodiments, these devices can be integrated.

Although two client devices 114 and 116 are shown in FIG. 1 to avoid over-complicating the figure, any suitable number of client devices, and/or any suitable types of client devices, can be used in some embodiments.

Figure 2:
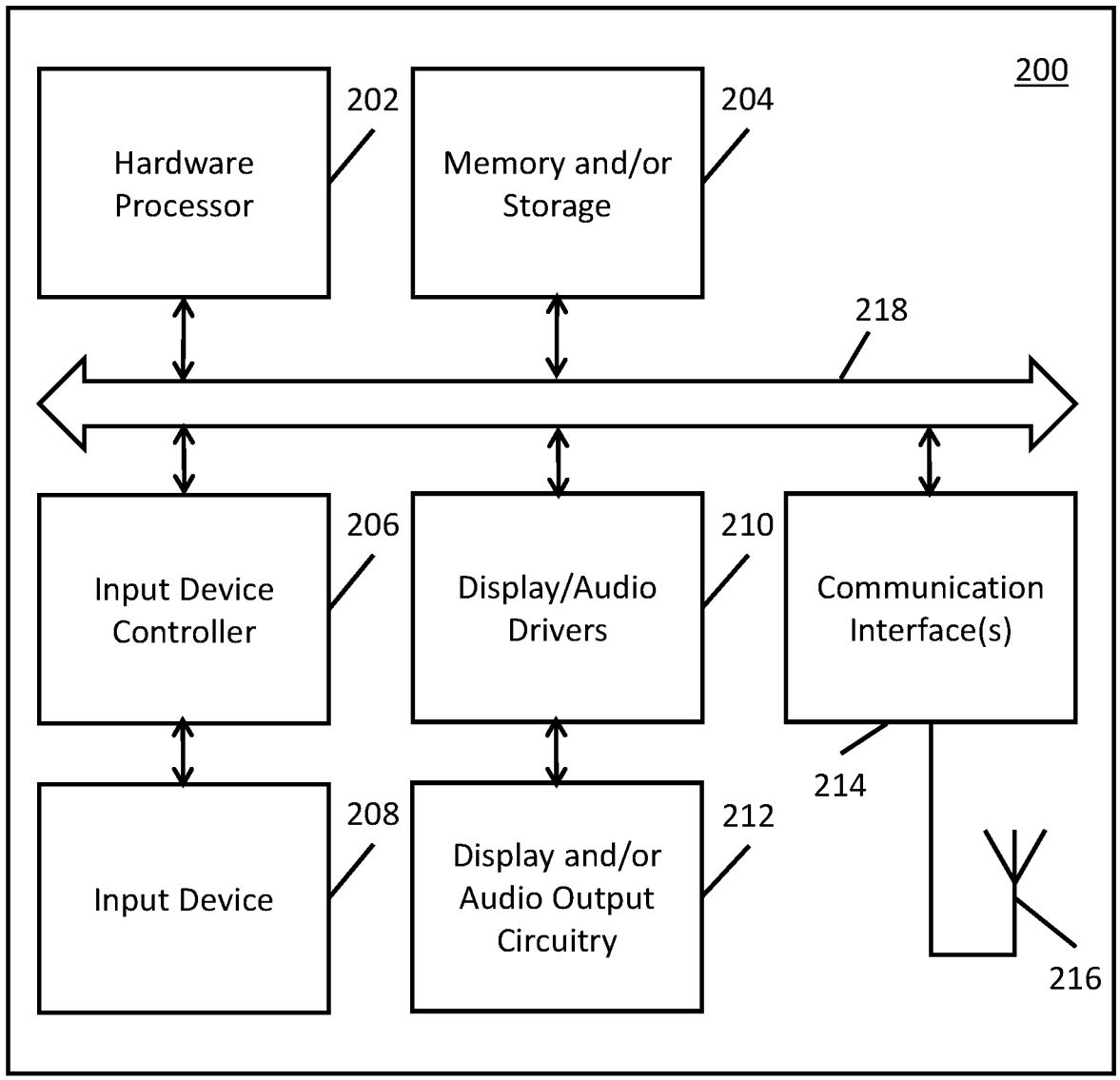
FIG. 2 shows an example of more specific hardware that can be used to implement some components of FIG. 1 in accordance with some embodiments.

Server 102, firewall 110, security device 108, and/or client devices 114 and 116 can be implemented using any suitable hardware in some embodiments. For example, in some embodiments, server 102, firewall 110, security device 108, and/or client devices 114 and 116 can be implemented using any suitable general-purpose computer or special-purpose computer. For example, a client device which is a mobile phone can be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 202 can be controlled by a program stored in memory and/or storage 204.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks (e.g., communication network 106 or 112). For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 106 or 112) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

Figure 3:
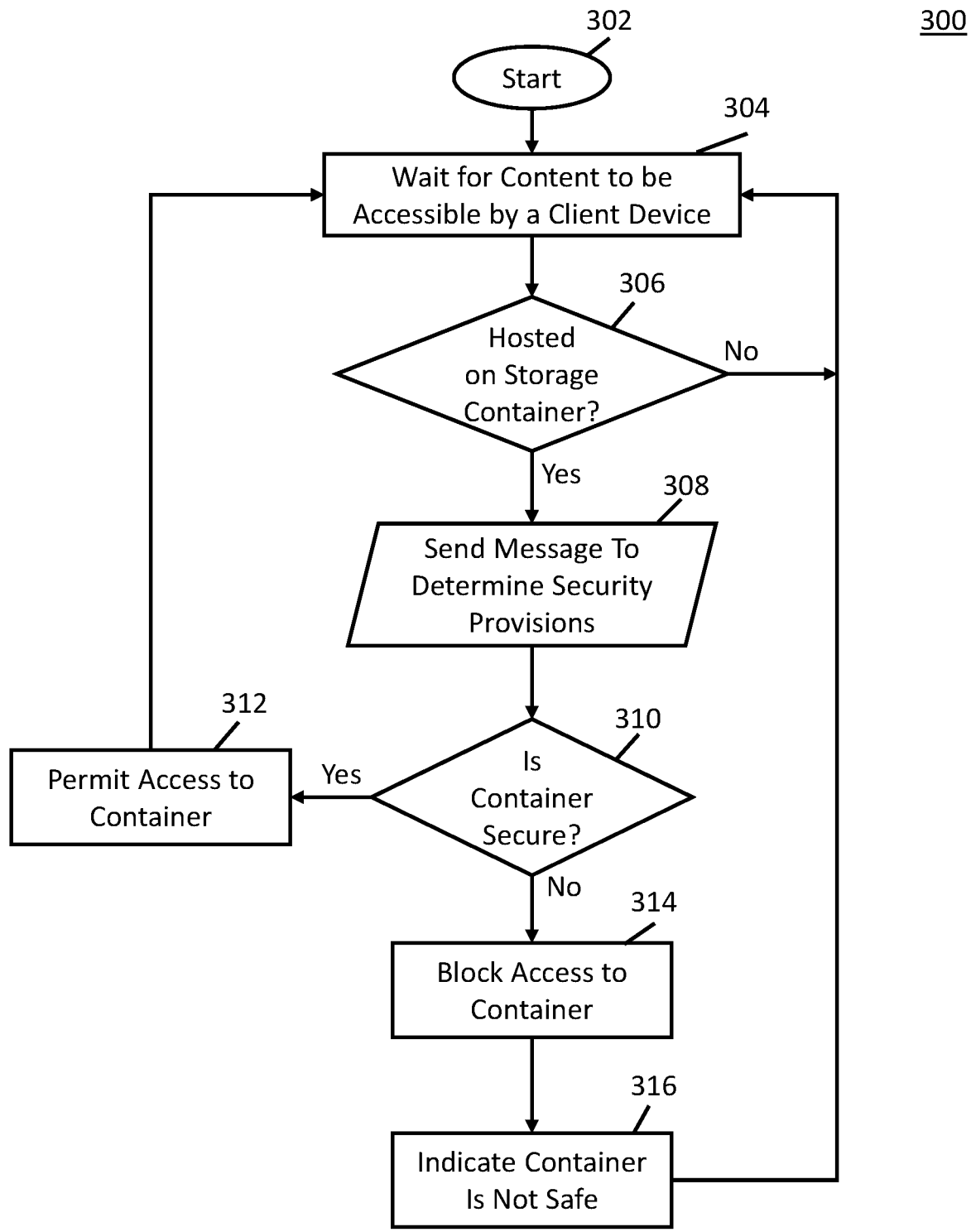
FIG. 3 shows an example of a process for protecting client devices from insecure cloud-based storage containers in accordance with some embodiments.

Turning to FIG. 3, an example 300 of a process for protecting client devices from insecure cloud-based storage containers in accordance with some embodiments is shown. Process 300 can be performed by any suitable device in some embodiments. For example, in some embodiments, process 300 can be performed by one or more of security device 108 and firewall 110. More particularly, for example, portions of process 300 can be performed by security device 108 and other portions can be performed by firewall 110. In another more particular example, all of process 300 can be performed by security device 108 or firewall 110.

As illustrated, after process begins at 302, the process waits for content to be accessible by a client device at 304. Process 300 can determine that content is accessible by the client device in any suitable manner. For example, process 300 can determine that content is accessible by the client device when a link to the content is provided to the client device as part of a web page. As another example, process 300 can determine that content is accessible by the client by observing application programming interface (API) calls between a server and an application on a client device that downloads content.

Next, at 306, process 300 determines if the content is hosted on a storage container. Process 300 can determine if the content is hosted on a storage container in any suitable manner. For example, in some embodiments, process 300 can determine that a URL for the content matches a domain of a storage provider known to use storage containers. As another example, in some embodiments, process 300 can determine that an Internet Protocol (IP) address associated with the content matches an IP address of a storage provider known to use storage containers.

If it is determined that the content is not hosted on a storage container, then process 300 loops back to 304.

Otherwise, process 300 proceeds to 308 at which it sends a message to determine the security provisions of the storage container. Process 300 can send any suitable message to determine the security provisions of the storage container.

For example, in some embodiments, process 300 can send a message to ask the storage container what security protocols apply using an application programming interface (API) of the storage container. More particularly, process 300 can ask what users are able to write, edit, and/or update content in the storage container, can ask what type of credentials are required to authenticate a user, can ask whether multifactor authentication is required to authenticate a user, can ask what IP addresses can authenticate a user, and/or any other suitable questions. In doing so, the process may inquire about access control lists (ACLs), bucket policies (e.g., S3 bucket policies), identity and access management (IAM) policies, and/or any other suitable type of security policies.

As another example, in some embodiments, process 300 can send a message to try to write content, edit content, and/or update content on a storage container to determine the security of the security container. More particularly, for example, process 300 can attempt to upload a file to the storage container.

Then, at 310, process 300 determines if the container is secure. Process 300 can determine if the container is secure in any suitable manner. For example, process 300 can determine that the container is secure by determining that only authorized personnel are able to write to, edit, and/or update the storage container and that sufficient protocols are in place to authenticate such users.

If it is determined at 310 that the container is secure, then, at 312, process 300 can permit access to the container and then loop back to 304. Access can be permitted in any suitable manner. For example, process 300 can instruct a firewall (such as firewall 110) to not block content from the storage container to the client device.

Otherwise, process 300 can proceed to 314 at which it can block access to the container. Access can be blocked in any suitable manner. For example, process 300 can instruct a firewall (such as firewall 110) to block content from the storage container to the client device. More particularly, in some embodiments, process 300 can instruct a firewall to block content by generating and sending to the firewall a script.

Next, at 316, process 300 can indicate that the container is not safe and loop back to 304. Process 300 can indicate that the container is not safe in any suitable manner. For example, in some embodiments, process 300 can cause a message to be displayed to a user of the client device that the content is not secure. As another example, in some embodiments, process 300 can cause a message to be displayed to a user of security device that the content is not secure. As yet another example, in some embodiments, process 300 can make a log entry that the content is not secure.

In some embodiments, process 300 can maintain a user interface (that is presented via any suitable device such as security device 108, firewall 110, and/or any other suitable device) identifying storage containers identified, the address(es) for the containers, whether the containers are secure or not, details of any security vulnerabilities of the containers, one or more reason code(s) for why the container was flagged as vulnerable, count and list of number of users accessing these containers, additional metadata about container referral/ownership, whether the containers are blocked, and/or any other suitable information.

In some embodiments, at least some of the above described blocks of the process of FIG. 3 can be executed or performed in any order or sequence not limited to the order and sequence shown in and described in connection with the figure. Also, some of the above blocks of FIG. 3 can be executed or performed substantially simultaneously where appropriate or in parallel to reduce latency and processing times. Additionally or alternatively, some of the above described blocks of the process of FIG. 3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for protecting a client device from an insecure cloud-based storage container stored on a server, comprising:

a memory; and a hardware processor couple to the memory and configured to:

determine that third-party content accessible by the client device is hosted in a third-party storage container on the server based upon a link to the third-party content being provided to the client device as part of a web page;

determine that the third-party storage container is not secure by:

sending a first message to the server that attempts to perform at least one of: writing content to the third-party storage container; editing content in the third-party storage container; and updating content on the third-party storage container; and in response to sending the first message, determining that unauthorized personnel are able to perform at least one of: writing content to the third-party storage container; editing content in the third-party storage container; and updating content on the third-party storage container; and block access by the client device to the third-party storage container.

2. The system of claim 1, wherein the hardware processor is further configured to send a second message that queries an access control list of the third-party storage container.

3. The system of claim 1, wherein the hardware processor is further configured to send a second message that queries policies of the third-party storage container.

4. The system of claim 1, wherein the hardware processor is further configured to receive a response to the message indicating that the third-party storage container can be written to by a party other than an owner of the third-party storage container.

5. The method of claim 1, further comprising generating an alert message that the third-party storage container is not secure.

6. A method for protecting a client device from an insecure cloud-based storage container stored on a server, comprising:

determining that third-party content accessible by the client device is hosted in a third-party storage container on the server based upon a link to the third-party content being provided to the client device as part of a web page;

determining that the third-party storage container is not secure by:

sending a first message to the server that attempts to perform at least one of: writing content to the third-party storage container; editing content in the third-party storage container; and updating content on the third-party storage container; and in response to sending the first message, determining that unauthorized personnel are able to perform at least one of: writing content to the third-party storage container; editing content in the third-party storage container; and updating content on the third-party storage container; and blocking access by the client device to the third-party storage container.

7. The method of claim 6, further comprising sending a second message that queries an access control list of the third-party storage container.

8. The method of claim 6, further comprising sending a second message that queries policies of the third-party storage container.

9. The method of claim 6, further comprising receiving a response to the message indicating that the third-party storage container can be written to by a party other than an owner of the third-party storage container.

10. The method of claim 6, further comprising generating an alert message that the third-party storage container is not secure.

11. A non-transitory computer-readable medium containing computer executable instructions that, when executed by a processor, cause the processor to perform a method for protecting a client device from an insecure cloud-based storage container stored on a server, the method comprising:

determining that third-party content accessible by the client device is hosted in a third-party storage container on the server based upon a link to the third-party content being provided to the client device as part of a web page;

determining that the third-party storage container is not secure by:

sending a first message to the server that attempts to perform at least one of: writing content to the third-party storage container; editing content in the third-party storage container; and updating content on the third-party storage container; and in response to sending the first message, determining that unauthorized personnel are able to perform at least one of: writing content to the third-party storage container; editing content in the third-party storage container; and updating content on the third-party storage container; and blocking access by the client device to the third-party storage container.

12. The non-transitory computer-readable medium of claim 11, wherein the method further comprises sending a second message that queries an access control list of the third-party storage container.

13. The non-transitory computer-readable medium of claim 11, wherein the method further comprises sending a second message that queries policies of the third-party storage container.

14. The non-transitory computer-readable medium of claim 11, wherein the method further comprises receiving a response to the message indicating that the third-party storage container can be written to by a party other than an owner of the third-party storage container.

15. The non-transitory computer-readable medium of claim 11, wherein the method further comprises generating an alert message that the third-party storage container is not secure.

* * * * *